United States Patent [19]

Hines et al.

[11] Patent Number: 5,505,083
[45] Date of Patent: Apr. 9, 1996

[54] SPLIT STATION MODULAR BALANCING AND CORRECTION MACHINE ALLOWING EARLY REMOVAL OF WORKPIECE

[75] Inventors: Gordon E. Hines; Vernon J. Burzan; Raymond A. Massaccesi, all of Ann Arbor, Mich.

[73] Assignee: Hines Industries, Inc., Ann Arbor, Mich.

[21] Appl. No.: 328,427

[22] Filed: Oct. 25, 1994

Related U.S. Application Data

[63] Continuation of Ser. No. 52,792, Apr. 23, 1993, abandoned.

[51] Int. Cl.[6] ................................. G01M 1/16
[52] U.S. Cl. .................... 73/462; 73/468; 901/8
[58] Field of Search ................. 73/462, 468; 29/901, 29/598; 901/8

[56] References Cited

U.S. PATENT DOCUMENTS

| | | | |
|---|---|---|---|
| 4,191,055 | 3/1980 | Orem et al. | 73/462 |
| 4,273,504 | 6/1981 | Shimatake et al. | 901/8 X |
| 4,419,894 | 12/1983 | Matumoto | 73/462 |
| 4,589,184 | 5/1986 | Asano et al. | 901/8 X |
| 4,803,882 | 2/1989 | Schonfeld et al. | 73/462 |
| 5,199,992 | 4/1993 | Hines | 118/669 |

FOREIGN PATENT DOCUMENTS 520853  1/1956  Canada.

OTHER PUBLICATIONS

Kokusai BM Series—FABM—8002 Brochure.

*Primary Examiner*—Richard Chilcot
*Assistant Examiner*—Joseph L. Felber
*Attorney, Agent, or Firm*—Emch, Schaffer, Schaub & Porcello, Jr.

[57] ABSTRACT

The invention provides a workpiece balancing and correction apparatus having separate modular stations. A measurement station provides balance measurement and correction auditing functions. A correction station provides material weight correction in one or two planes. A transfer module is designed to transport workpieces between the measurement module and the correction module and maintain the cycle speed of operation of the overall machine in keeping with constant activity at the slowest module.

27 Claims, 6 Drawing Sheets

SPLIT STATION MODULAR BALANCING AND CORRECTION MACHINE ALLOWING EARLY REMOVAL OF WORKPIECE

This a continuation of application Ser. No. 08/052,792 filed on Apr. 23, 1993, now abandoned.

BACKGROUND OF THE INVENTION

The present invention provides an improvement pertaining to an apparatus intended for use with the dynamic balancing of rotating workpieces, such as armatures. Balancing operations involving rotating workpieces generally require that some, if not all, of the following steps be performed:

picking up the workpiece from a feed conveyor and transferring it to a balance measurement station;

measuring the amount and angle of unbalance at the measurement station;

indexing the workpiece to a first correction plane;

performing a weight correction by weight removal or weight addition at the first correction plane;

indexing the workpiece to a second correction plane if two-plane balancing is required;

performing a weight correction at the second correction plane, if necessary, by weight addition or weight removal;

auditing the workpiece correction and balance;

transfer of the workpiece from the audit apparatus to the exit conveyor.

Currently, two distinct types of devices commonly offer the capability of performing these balancing steps. These devices are generally referred to as a master station apparatus and a multi-station apparatus. Balancing machines based on the master station concept involve a transfer system which brings the workpiece to one machine at one location. The single master machine performs all individual balancing measurement and audit functions and all correction functions as necessary without any transfer of the workpiece between functions. Balancing machines based on the multi-station concept spread the balancing measurement and audit functions and correction functions to separate machines located at distinct stations so that each step of the balancing cycle is performed at a separate station. A transfer system picks the workpiece up at each station and delivers it to the next station in line.

The multi-station apparatus is capable of performing at high production rates, primarily as a result of the fact that each of the individual stations are capable of performing their individual tasks at the same time. Further, even though the multi-station machine is complex as a whole, each individual machine component or station is relatively simple in design and less costly than a master station machine. The multi-station apparatus does, however, have disadvantages due to the overall complexity of the machine and the potential for duplication of expensive components at the individual stations. For instance, two balance measurement stations are generally required—one for the original balancing measurement step and the second for the audit balance measurement step; two weight correction and clamping stations are necessary following the original balancing measurement station for correction in the first plane and the second, if two plane correction is required, following the first plane correction station; numerous indexing mechanisms to maintain proper alignment of the workpiece between stations; and numerous transfer mechanisms and grippers located between each of the component stations. Add to this extensive amount of duplicated componentry the necessary electrical components, controls, computers and programming requirements and it is quite obvious that multi-station devices can sometimes be undesirably complex and expensive.

Another complexity involving multi-station devices lies in the necessity of maintaining a known angular orientation of a workpiece as it is transferred between stations. Typically, the workpiece index angle must be closely held within tolerance between at least the measurement or audit stations and the correction stations or correction inaccuracies may occur. For instance, during a complete balancing cycle, the workpiece is received from an in-feed conveyor and placed on a balance measurement machine. The amount and angle of unbalance is determined by the measurement machine and the workpiece is then indexed to the proper angle for the correction step. The indexed workpiece is then transferred to a weight correction machine and a calculated amount of material is either removed from or added to the workpiece at the proper angle orientation. In some instances of two-plane correction, the workpiece is again indexed and may be transferred to a second weight correction machine. After the weight correction steps, the workpiece is transferred to a second measurement machine and audited. At this point, the corrected workpiece is either rejected or accepted. Thus, it can be seen that the indexing of the workpiece and maintenance of its angle orientation is critical between balancing, correction, auditing and re-correction steps.

The multi-station device generally requires that most automated production lines be unidirectional. Therefore, once in the loop, the workpiece must continue through the entire cycle. If a workpiece is found to be in tolerance at the first measurement station and does not need correction, it must still continue the cycle through all the stations. Further, if the workpiece is not in balance after going through the entire balancing sequence, it must usually be removed from the exit conveyor and brought to a manual machine for further balancing. The out-of-tolerance workpiece cannot be recycled through the automated line because no memory is retained which accounts for previous corrections made to the part. Therefore, on re-correction, the part could potentially receive a correction operation at the position of the original correction.

The master station balance and correction apparatus sometimes presents a desirable alternative to the multi-station apparatus. Duplication of machine components is eliminated and the transfer of workpieces between stations, with the exception of the loading and unloading of the workpiece, is eliminated. Because there is no transfer operation between stations, there is no need for complex orientation and indexing maintenance equipment. Further, in the master station apparatus, workpieces that do not require correction can be immediately returned to the conveyor, thus saving cycle time and idle time. Another desirable characteristic of the master station apparatus is the ability to remeasure the balance and make additional corrections to the workpiece without removal of the workpiece from the machinery. In this instance, the computer retains previous correction memory for a given workpiece and the workpiece can be effectively fine-tuned in correction without difficulty. Finally, the master station device generally has less initial cost than the multi-station balancers. However, to equal the production rate of a multi-station balancer and correction device, three or four master station devices may be needed. Thus, overall costs potentially remain high. The use of a multiple number of master station devices does provide versatility and the advantage that if one of the master station devices breaks down the others will continue production whereas if one station in a multi-station machine breaks down all production for the entire line is halted.

Production speed is always an area of concern when inserting a balancing and correction station into an assembly or production line. The speed with which workpieces can be transferred between conveyors and various work stations comes under continuous scrutiny. Two transfer systems are most commonly employed in balance measurement and correction operations. The walking beam transfer system employs a pivoting articulating beam to move or "walk" workpieces in a single direction. The walking beam system is not commonly employed with balancing and correction operations because it has minimum flexibility and can only move in one direction for a fixed distance and is difficult to incorporate into congested areas. The more commonly used transfer system is generally referred to as "pick and place" transfer technology.

The pick and place type transfer system commonly includes one or more vertical up/down slide members mounted on a single carrier plate. The carrier plate is usually mounted on a single slide unit designed for horizontal linear transfer or for non-linear rotational transfer. Each up/down slide member includes a set of grip mechanisms which are spaced so as to allow two workpieces to be held side-by-side without interference. The carrier plate with the slide members and two grip members travels on the single slide unit between the various balance measurement and correction stations. Pick and place transfer systems of this type commonly use valuable cycle time in two detrimental ways: since the grip members are mounted side-by-side, the transfer apparatus must traverse the distance separating the grip members in order to position one or the other set of grip members over a single station. For instance, in high speed automated lines having total balance measurement and correction cycles times per workpiece of between six and twelve seconds, this transfer time can add approximately 1 to 1.1 seconds to a cycle. Further, once one set of grip members is in position over the station, the grip member is moved down or up on its slide to "pick" a workpiece out of the station. The other set of grip members must then move down or up to "place" a new workpiece into the same station after the transfer time. Each down/up motion takes approximately 0.8 to 1 seconds to "pick" and "place" workpieces, thereby adding approximately 1.6 to 2 seconds of cycle time to the 1 to 1.1 seconds of transfer time. In high speed automated lines, this cycle time presents a target for improvement.

It can be seen that the multi-station balancing and correction devices provide for a high production rate but provide very little versatility and are prone to circumstances wherein the entire line may be shut down due to the failure of one component of the device. The master station balancing and correction devices cost less than the multi-station device on a per unit basis yet have greatly diminished production capacity when compared with the multi-station apparatus. Thus, it is an object of the present invention to provide a balancing and correction device having the simplicity in components and versatility of production of the master station apparatus and yet produce the higher production rate available with the multi-station apparatus.

Another object of the invention is to provide a differentiation between the balance measurement and audit functions and the correction functions within a single device or machine.

Yet another object of the invention is to provide a single device having a balance measurement and audit modular station and a correction modular station.

A further object of the invention is to provide a balancing and correction machine wherein the transfer mechanism between the balance measurement and audit modular station and the correction modular station allows work to be done on workpieces at both stations simultaneously.

Yet another object of the invention is to optimize transfer time between stations and therefore produce the least amount of transfer time impact on overall cycle time.

Another object of the invention is to provide for a correction detection for workpieces to determine where previous corrections were made on a workpiece prior to providing additional corrections to the workpiece.

A final object of the invention is to maintain speed of operation of the balancing machine in keeping with constant activity at the slowest cycle step.

SUMMARY OF THE INVENTION

The present invention provides a workpiece balancing and correction apparatus which achieves the objectives by providing two modular stations, a balance measurement and audit station and a correction station in a single machine apparatus. The correction station is modular in design and may include any of the following correction devices: a two plane correction mill; a combination mill and nibbler module; a weight addition module; or any combination of desired weight correction devices. The present invention provides that the desired correction module can be placed at the correction station in proximity to the measurement module to give the machine greater flexibility in manufacturing and use. Thus, the present invention provides an improvement as a hybrid of a multi-station apparatus and a master station apparatus.

The split station modular approach of the present invention further incorporates a unique "V" oriented transfer mechanism that enables the achievement of simultaneous activity at both stations wherein measurement and auditing of unbalance on one workpiece is accomplished while another workpiece is undergoing correction. The invention further achieves the objective of maintaining speed of operation of the overall apparatus in keeping with constant activity at the slowest cycling station.

The present invention is intended to provide a workpiece balancing and correction apparatus which is available in one of two modes of operation. In a fully automatic mode of operation, the transfer mechanism transports workpieces between the measurement and correction modules and the in-feed and out-feed conveyors. In the second envisioned mode of operation, the transfer mechanism is semi-automatic in that it transports workpieces only between the correction and measurement modules.

The features of the present invention will become more readily apparent upon review of the figures and the following description of the preferred embodiment of the invention.

BRIEF DESCRIPTION OF THE DRAWINGS

FIG. 1 is a perspective view of the split station balancing and correction machine of the present invention;

DETAILED DESCRIPTION OF THE PREFERRED EMBODIMENT

Figures 1, 9:
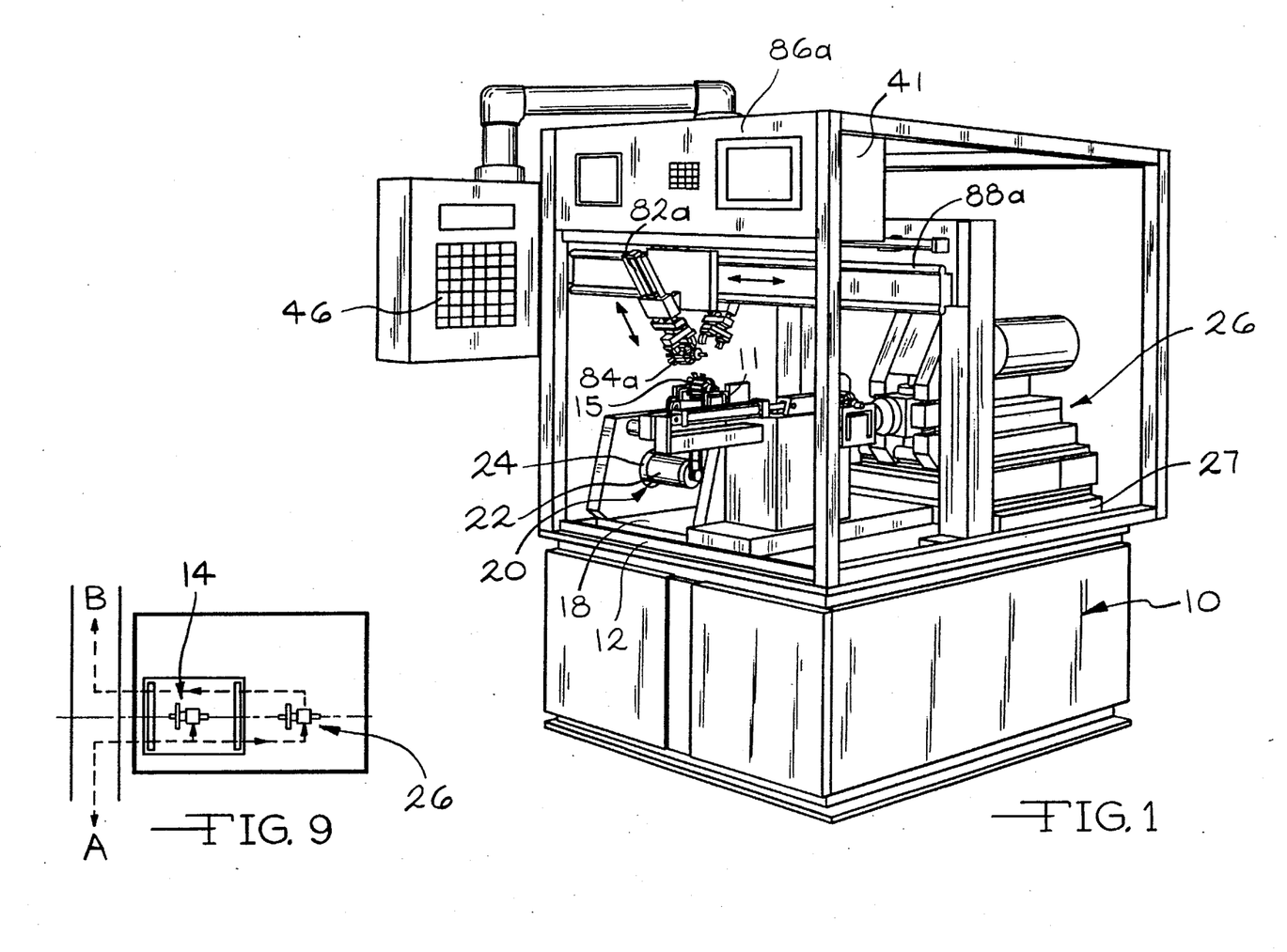
Figure 2:
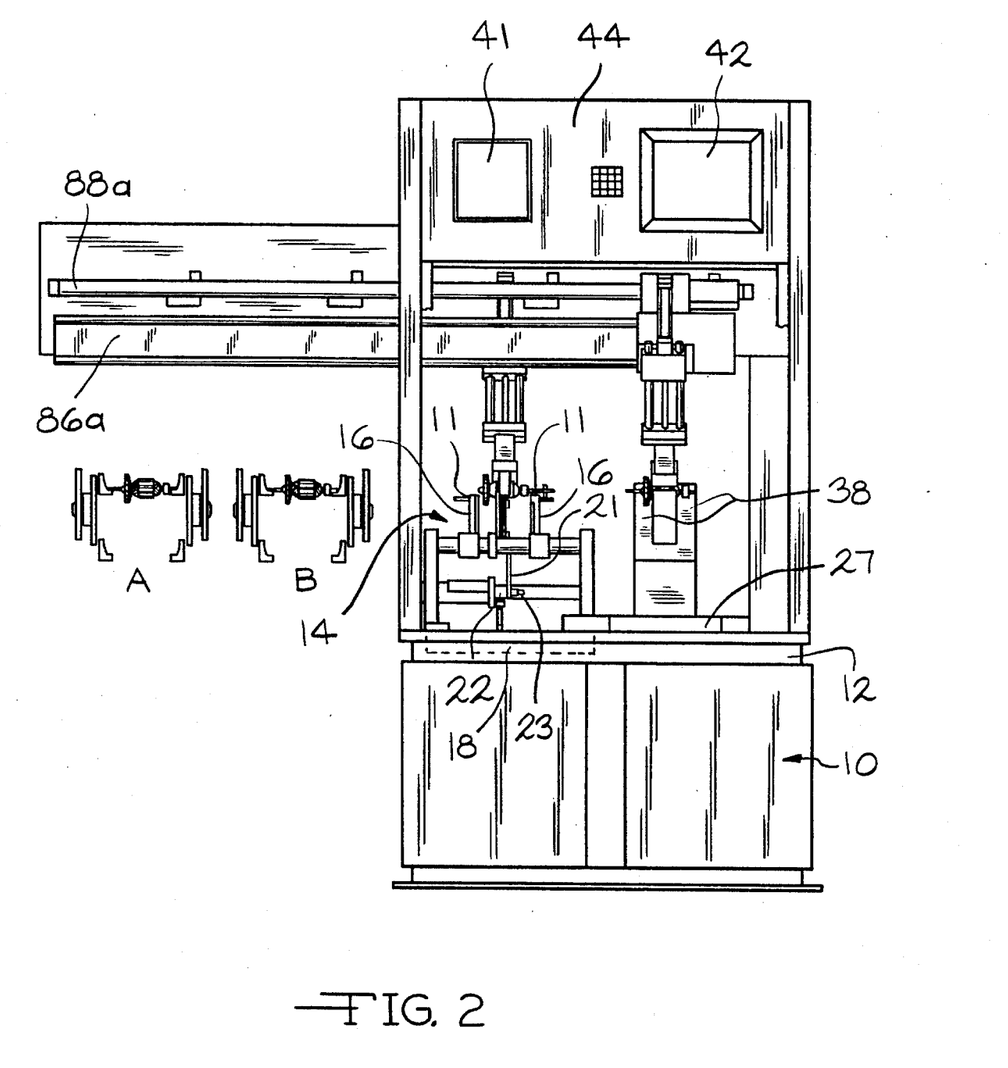
FIG. 2 is a front view of the balancing and correction machine of the present invention.
Figure 3:
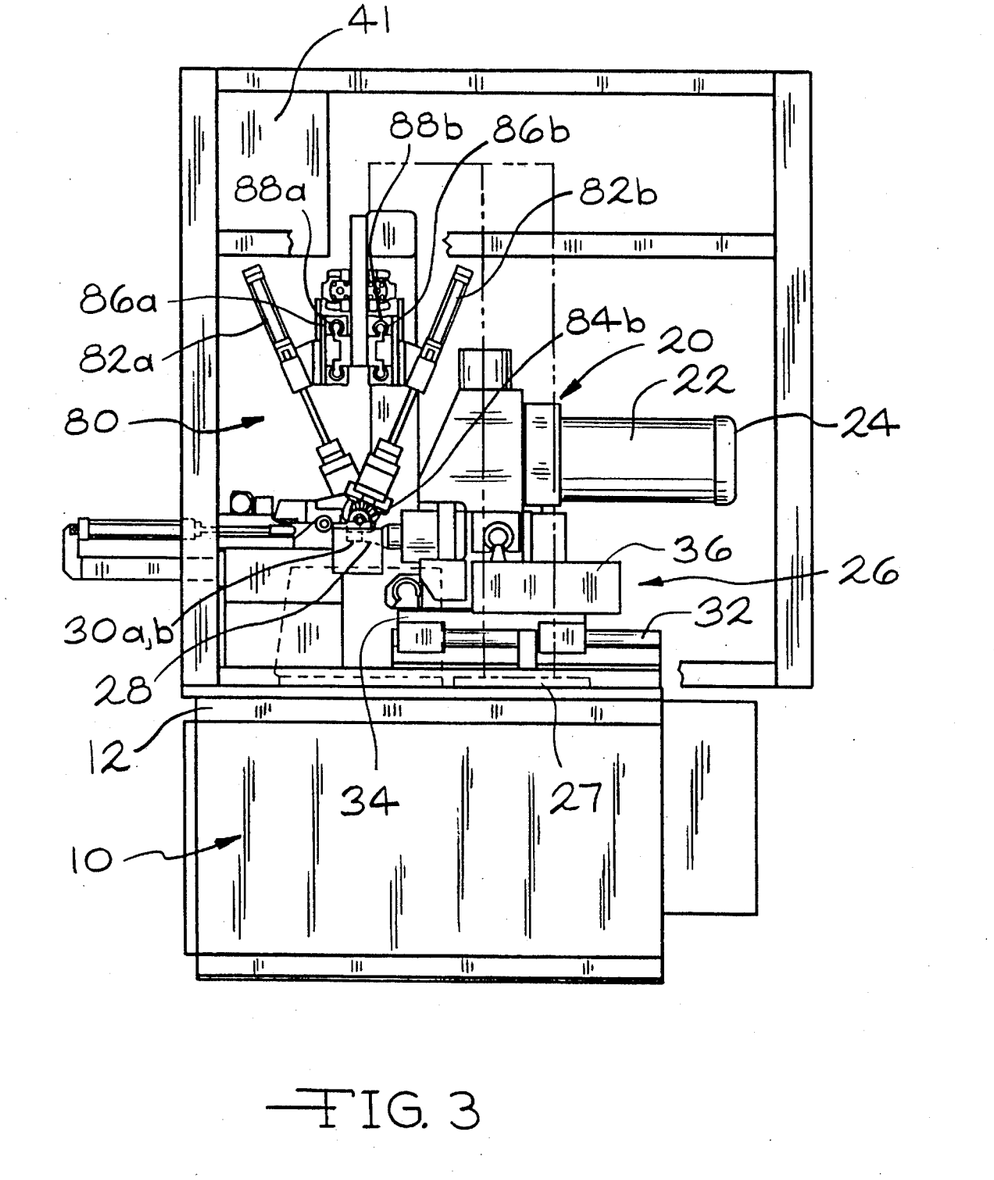
FIG. 3 is a side view of the balancing and correction machine of FIG. 2.

The split station modular balancing and correction machine of the present invention is generally shown in FIGS. 1–3, having a concrete base member 10 designed to provide dynamic stability, and a top plate 12 for the mounting of various machine components. The balance and audit measurement module 14 includes a subplate 18 which is fixed on the top plate 12 of the apparatus. The measurement module generally includes two stanchion members 16, designed to support the workpiece during the balancing measurement operation.

Referring now to FIGS. 1–4, the stanchion members 16 each include bearing blocks 15 fixed to resilient suspension members 11. The bearing blocks 15 are positioned to receive a workpiece such as an armature. For the purposes of description, the invention will be described for use in the balancing and correction of armatures. However, it is to be understood that the invention may be adapted for use in the dynamic balancing of any rotating workpiece.

Figure 4:
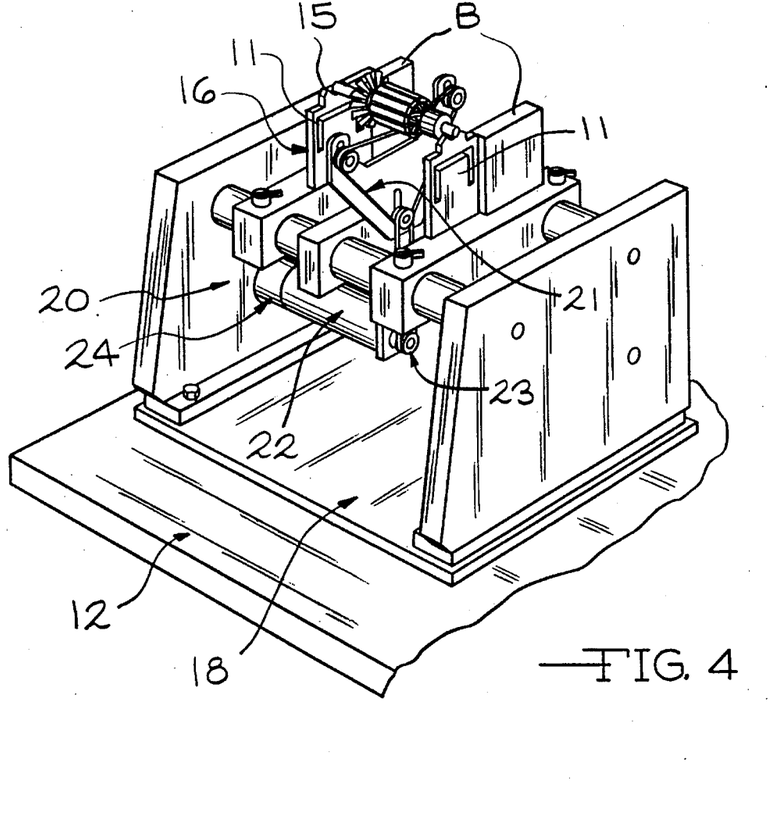
FIG. 4 is a detailed perspective view of the measurement module intended for use with the balancing and correction machine of the present invention.

Pick-up sensors 13 are in communication with each bearing block and are used to detect any vibration within the respective bearing block 15 due to any rotational unbalance in the armature. The pick-up sensors 13 will measure the amount of vibration detected and provide signals to the controller 41 relative to the amount and angular location of any point of unbalance.

A drive member 20 is included with the measurement module 14 and preferably includes a servo drive motor 22 equipped with an encoder mechanism 24. The drive motor 22 is engaged with the workpiece by means of the belts 21 and pulleys 23 which allow the drive motor 22 to index and rotate the workpiece to predetermined angles. Since the measurement module 14 only performs the operations of initial measure of unbalance, indexing to the correction plane, and auditing, the drive member 20 for the measurement module 14 can be a simple under-the-workpiece tangential drive unit. However, the measurement module 14 can be utilized with any number of different drive members such as tangential, end, overarm, with servo, DC motor driven, air driven, etc. Thus, the incorporation of a measurement module 14 having different drive members gives the overall machine great flexibility in design.

Figure 5:
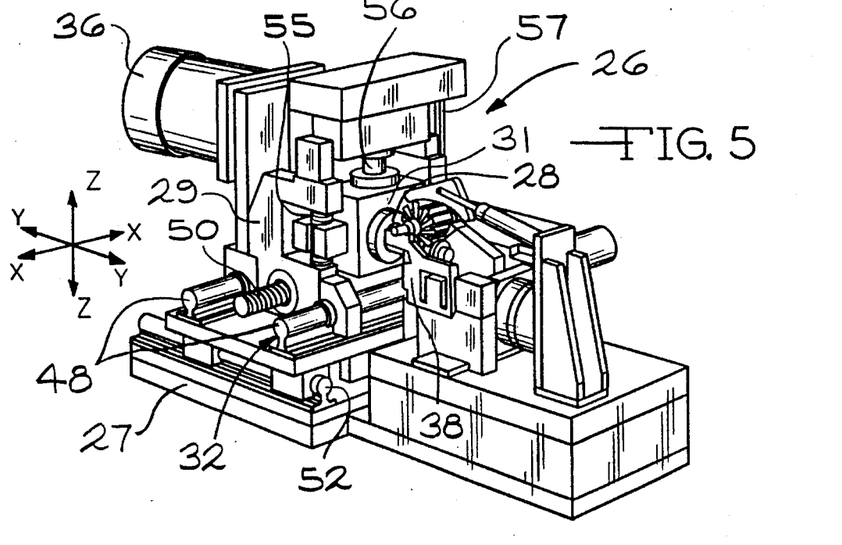
FIG. 5 is a detailed view of a modular mill station intended for use with the balancing and correction machine of the present invention.
Figure 6:
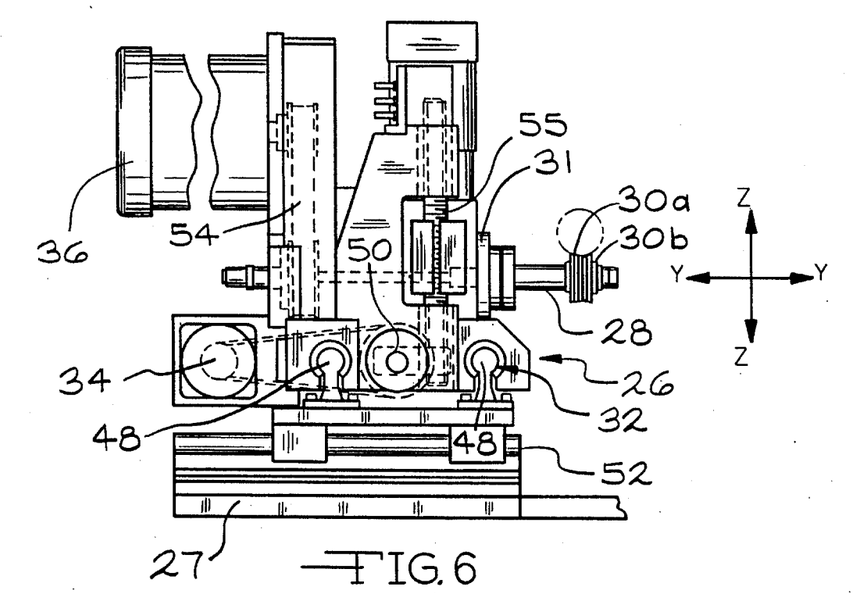
FIG. 6 is a side view of the modular mill station of FIG. 5.

The invention in FIGS. 1–3 is shown as used with a correction module 26 containing a two-plane mill as shown in FIGS. 5 and 6. The modular design for the correction module 26 provides for the ability to utilize different correction modules such as the mill-only module of FIGS. 5 and 6, a combination mill and nibbler module, and weight addition modules, such as those generally disclosed in U.S. Pat. Nos. 5,197,633 and 5,199,992. The combination mill and nibbler module (not shown) is a special modification of the mill shown in FIGS. 5 and 6. A nibbler correction device is added to the mill module which is designed to remove material from very light or thin rotor components, such as fan fins. Usually these components are so thin that milling is an undesirable method of accurate weight removal so the nibbler module is incorporated to effect weight correction in one-plane and the mill is used for weight correction in the second plane. The nibbler module commonly appears as a punch device, such as a tool and die, defining a known shape to be cut out or removed from the workpiece. The die supports the structure of the workpiece surrounding the removal area. The tool is driven, usually pneumatically, through the workpiece into a mating cavity within the die to "punch" or cut out a specified amount of material from the workpiece. The tool and die of the nibbler are commonly mounted on a servo encoded ball slide with drive motor so that the tool and die move radially with respect to the axis of the workpiece. This allows the tool and die nibbler to be accurately positioned for control over the radial depth of cut.

The controlling for the tooling and components of the machine of the present invention is supplied by a microprocessor controller generally designated as 41 having a CRT display 42, key pad 44, and control panel 46. The controller 41 utilizes the various servo motors of the measurement module 14 to calculate the angle and amount of correction necessary for a given workpiece. The various servo mechanisms maintain the indexing alignment of the workpiece as the workpiece is transferred between the measurement module to the correction module and are further used to adjust the depth of cut of the cutting heads 30a, 30b as the correction is being performed. The controller 41 recalculates new cross-sectional volumes of the workpiece based upon the amounts of correction and retains the reading from each spin and correction cycle, using those readings to more closely finish each successive armature using a process similar to that disclosed in U.S. Pat. No. 4,790,697. The control systems further provide flexibility to allow the workpiece to be removed from the machine if the workpiece meets preset tolerances of unbalance at anytime during the balancing and correction operation.

Referring now to FIGS. 5 and 6, the correction module 26 which is composed of a two-plane mill module is shown in detail. A slide member 32, preferably including a pair of spaced ball-slide rails 48, is positioned parallel to the centerline of the workpiece when the workpiece is positioned on the stanchions 38. A mill carriage 29 carrying the reversible spindle 28 is positioned on the ball-slide rails 48 for movement thereon along the axis of the workpiece, hereinafter referred to as the x-axis. A ball screw 50 is positioned between the two spaced ball-slide rails 48 and interconnects with the mill carriage 29 to drive the carriage 29 along the rails 48. A servo drive motor 34 is engaged with the ball screw 50 and includes an encoder (not shown) to feed positional information to the controller 41.

The mill carriage 29 is also positioned for movement along the y-axis on two spaced ball-slides 52. In the preferred embodiment, the ball-slides 52 are mounted in a perpendicular orientation to the ball-slide rails 48. The mill carriage 29 is driven along the y-axis by a pneumatic cylinder (not shown).

The reversible spindle 28 includes two cutting heads 30a, 30b. The two cutting heads are oriented to perform milling cuts when rotated in opposed directions. Thus, the spindle 28 can be rotated either clockwise or counterclockwise to prevent unwanted damage to the laminations of the workpiece during milling. The opposed end of the mill spindle 28 is in communication by means of belts 54 with the mill drive motor 36. The mill spindle 28 is carried for movement in the z-axis direction by spindle mounting block 31. The spindle mounting block 31 is positioned on parallel ball slides 55 and is driven along the z-axis on the ball slides 55 by ball screw 56 which is engaged with servo drive motor 57. An encoder (not shown)is in communication with the drive motor 57 to relay z-axis positional information to the controller 41.

Figure 8:
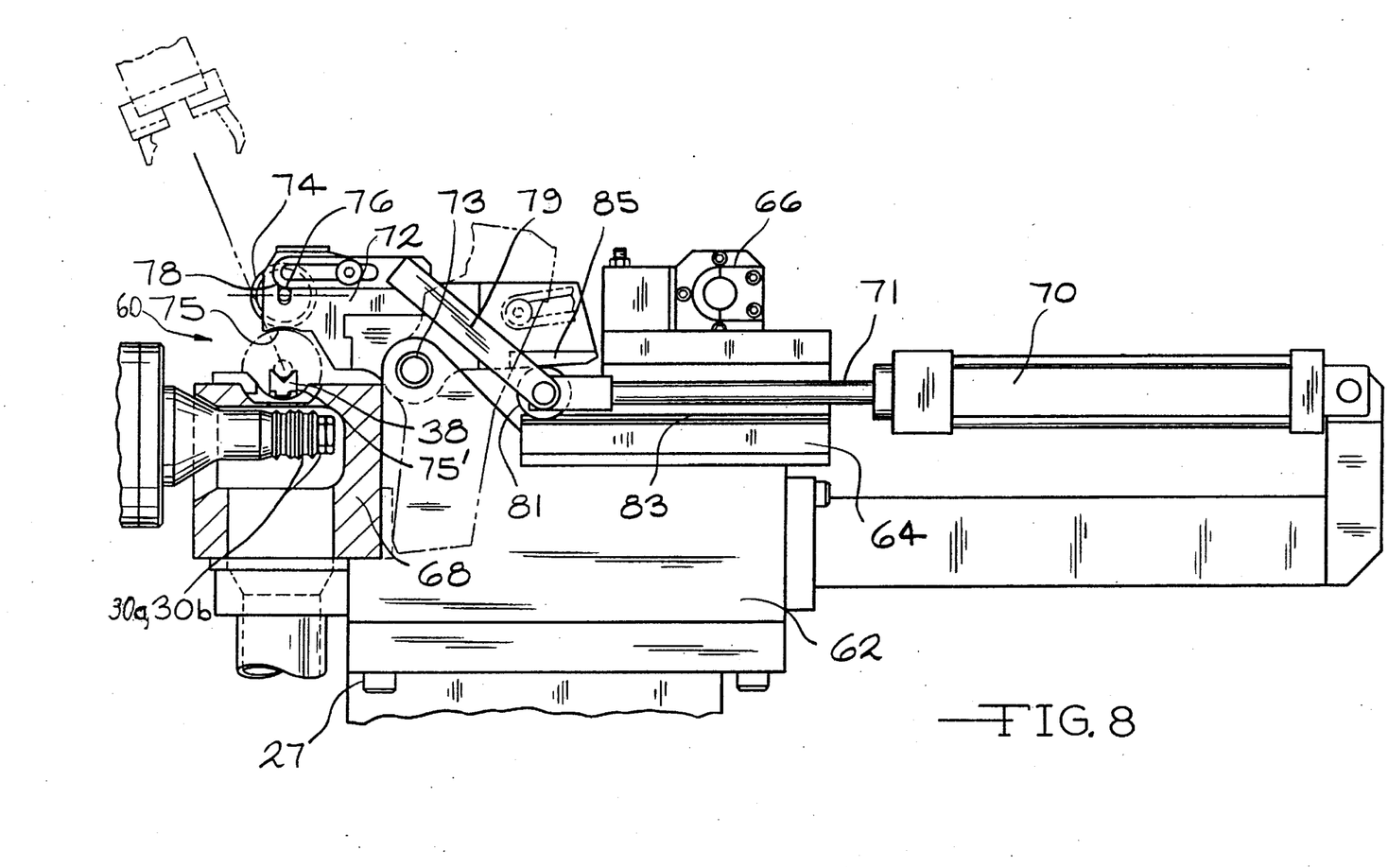
FIG. 8 is a detailed view of the clamp mechanism with indexing wheel as incorporated with the correction module of the balancing and correction machine of the present invention; and, FIG. 9 is a plan view of the workpiece flow pattern of the balancing and correction machine of the present invention.

Referring now to FIG. 8, the clamp member 60 intended to fix the workpiece in a given angular index position is shown. The clamp member 60 includes a base member 62 which is fixed to the second subplate 27. A first jaw member 68 is fixed to the base member 62. Positioned in the first jaw member 68 are the stanchion supports 38. The stanchion supports 38, preferably are resiliently mounted to retract when the clamp 60 secures the workpiece for correction.

The base member 62 also carries a slide member 64 having a roller assembly 81 engaging a track 83. The roller assembly 81 is positioned on a cylinder rod 71 of a piston cylinder 70. A second jaw member 72 is fixed about a pivot point 73 to the base member 62 in opposed relationship to the first jaw member 68. The second jaw member 72 is also engaged with the roller assembly 81 by means of a rocker arm 79 which acts to retract the second jaw member 72 out of engagement with the workpiece as the cylinder rod 71 is retracted into the cylinder 70. This clears the second jaw member 72 to allow a workpiece to be removed from or loaded onto the stanchion supports 38. To clamp a workpiece in position for correction, the cylinder rod 71 is extended causing the rocker arm 79 to position the second jaw member 72 over the workpiece in opposition to the first jaw member 68. As the cylinder rod 71 reaches its full extension, the roller assembly 81 engages ramp surface 85 of the second jaw member 72 and forces the second jaw member 72 to rotate about pivot point 73 and securely clamp the workpiece in a fixed position.

The jaw members 68, 72 each include a radially curved engagement surface 75, 75' which acts to engage the circumference of the workpiece and clamp the workpiece in a fixed position for the milling operation.

The clamp member 60 operates to fix the workpiece in a given indexed position. An indexing wheel 74 is positioned within the second jaw member 72 and is adapted therein for extension slightly beyond the engagement surface 75 of the second jaw member 72. The indexing wheel 74 is retained in slots 76 by resilient spring member 78 and retracts away from the engagement surface 75 of the second jaw member as the jaw members are clamped about the workpiece. As the jaw member 72 is removed from engagement with the surface of the workpiece, the indexing wheel 74 will be extended by force of the spring member 78 to continue engagement with the surface of the workpiece. Thus, as the jaw member 72 is released incrementally from engagement with the surface of the workpiece, the indexing wheel 74 will maintain contact with the workpiece. The indexing wheel 74 is in communication with drive motor 66 and is used to rotate the workpiece and index the workpiece to a designated second plane of correction. A position encoder (not shown) is in communication with the servo drive motor 66 to relay positional information on the workpiece to and from the controller 41.

Figure 7:
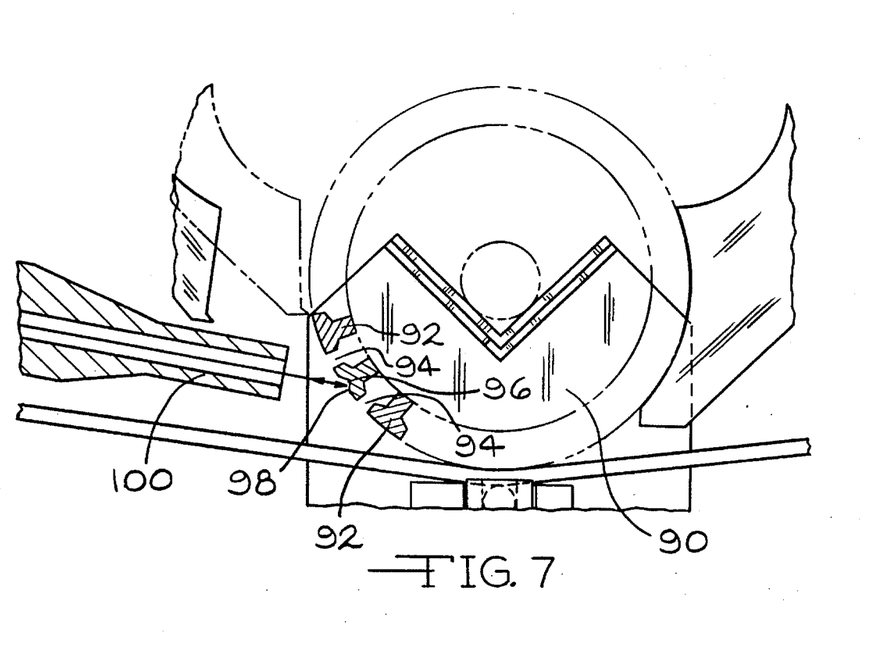
FIG. 7 is a diagrammatic view showing the cut detection system as used with the balancing and correction machine of the present invention.

The present invention may also include a cut detection apparatus as shown in FIG. 7. After a workpiece is corrected, the workpiece is normally audited by remeasuring the unbalance wherein the necessary angle and amount of re-correction, if any, is determined. Further, it must be determined where, if any, previous corrections were made so that the milling machine will not attempt to re-operate in a location previously corrected. If the workpiece remained within control of the machine, it is possible that the controller retained memory of the location where corrections were previously attempted on the workpiece. However, if the workpiece was removed from machine control or taken out of sequence, the cut detection system of the present invention re-establishes a reference point taking into account previous corrections made to the workpiece in relationship to the new reference point.

Most reference point detection systems operate to detect a physical feature or mark on the workpiece. In the case of an armature, the stack 90 is normally divided into radially oriented segments 92 extending parallel to the armature's axis of rotation. The gaps 94 defined between the segments 92 are radial and normally perpendicular to the circular outer circumference of the armature. Thus, the controller 41 establishes one of the gaps 94 as the reference point and uses that reference point to index the armature to its proper angular orientation for the weight correction step.

After a correction by milling has been made a V shaped groove or cut 96 appears in the armature stack 90. The walls 98 of the cut 96 are generally less than perpendicular with respect to the circular outer surface of the armature. Thus, the cut 96 walls 98 can be distinctly monitored and differentiated from the segment 92 gaps 94. A fiber optic sensor 100 designed to reflect light off the cut 96 walls 98 is positioned at an angle so that it will see the optical reflection off of the cut 96 wall 98 but will not receive the reflection off of a gap 94 wall. The fiber optic sensor 100 will thus sense cuts made at specific locations along the stack 90 for each plane of correction. As the workpiece is rotated, the sensor 100 signals are received and recorded by the controller, thereby recording the angle orientation of any correction to the armature. The controller 41 then continuously updates the information for the location of the previous corrections in relation to the reference point signal, thus allowing any future planes of correction to disinclude the previous cut points.

The transfer module 80 of the present invention is shown in detail in FIGS. 1 and 3 and the transfer path for the workpiece is shown in detail in FIG. 9. The transfer module 80 transports workpieces from the incoming conveyor A to the measurement module 14, from the measurement module 14 to the correction module 26, between the correction module 26 and measurement module 14 for auditing and re-correction purposes, and back to the outgoing conveyor B.

The transfer module 80 of this invention incorporates a "V" oriented grip apparatus having down/up slides and grip members. Each grip member of this "V" oriented structure is positioned to receive and deliver a workpiece to a single position which corresponds with the bottom end point of the "V" and then retract so as to clear the end point of the "V" for access by another workpiece retained in the alternate grip member. Each half or arm of the "V" structure includes a cylinder 82a, 82b having a grip member 84a, 84b attached thereto. Each cylinder 82a, 82b is engaged with a dedicated carrier plate 86a, 86b which in turn is mounted on separate back-to-back horizontal slides 88a, 88b. The horizontal slides 88a, 88b extend from a position proximate the conveyor(s) A, B which may be a single conveyor A or dual conveyors A, B to a position relative to the stanchions 16 of the measurement module 14 and further to a position proximate the stanchions 38 of the correction module 26. Each half of the "V" structure moves independently of the alternate half. Thus, the grip members 84a, 84b and their respective carrier plates 86a, 86b can move workpieces independently between the conveyors A, B and the modules 14, 26 while the module devices are operating through their cycle. For instance, one half of the "V" apparatus may be picking up a new workpiece or dropping off a finished workpiece over the conveyors A, B while the other half of the "V" is transferring a workpiece between modular stations.

The "V" oriented transfer apparatus and combination of a "V" structure with each half on a separate horizontal slide provides for greatly reduced cycle time. Cycle time is determined by the length of time it takes for the longest of the balancing steps to finish plus the length of time it takes to move the workpiece and reload with the next workpiece. With the "V" transfer module arrangement, as soon as the module with the longest cycle is finished, one grip member and one half of the "V" removes the workpiece and immediately thereafter (with no traverse in between as is the case with side-by-side or radial transfer pick and place transport systems) the grip members on the other half of the "V" loads the next workpiece. This saves the time lost with the in-between traverse (1.5 to 2 seconds). The cycle time saved, in combination with the dedicated carrier plates and slides allow for greater general flexibility in moving the workpieces for each grip member, setting up the machinery and switching from one-plane correction to two-plane correction with or without an audit cycle. The independent movement of each up/down slide of the "V" is preferably provided by a known-stroke cylinder which takes the grip members into and out of engagement with the specific stations. Movement of the carrier plates over the conveyors, the measurement module, and the correction module can be effected by any number of systems such as ball screws, servo drives and other known methods of driving the slide.

It should be noted that the above description of the preferred embodiment is intended to be illustrative in nature and not necessarily limiting upon the scope and content of the following claims. For instance, it is envisioned that the split station device described herein can be utilized, as desired, alternately for achieving workpiece correction in one-plane as well as two-plane. Further, if production demands are requiring decreased cycle times, it is envisioned that a separate audit module may be incorporated into the overall machine thus allowing for original balance measurement, correction, and balance auditing of distinct workpieces to be performed at the same time.

We claim:

1. A two-station balancing and correction apparatus for use in achieving the dynamic balance of a rotational workpiece comprising, in combination:

a unitary base member;

a measurement module fixed to said base member having means for supporting a workpiece, drive means for engaging the workpiece and dynamically rotating the workpiece, and detection means for providing signals relating to the amount and location of any rotational unbalance in the rotating workpiece;

a correction module fixed to said base member adjacent to said measurement module having means for supporting the workpiece and material weight correction means for modifying the weight of the workpiece at a specified location on the workpiece and in an amount calculated in response to signals provided by said detection means;

a transfer module also fixed to said base member for transporting the workpiece between said measurement module and said correction module; and, controller means for receiving signals from said detection means and for calculating the amount and location of any weight modification and for providing signals to said correction means related to such calculations;

wherein said controller means compares unbalance data with a pre-established tolerance factor and signals the transfer module to remove the workpiece from said balancing and correction apparatus or return the workpiece to said correction module for further weight correction.

2. A two-station balancing and correction apparatus for use in achieving the dynamic balance of a rotating workpiece comprising, in combination:

a unitary base member;

a first operation station fixed to said base member having means for supporting a workpiece, drive means for engaging the workpiece and dynamically rotating the workpiece, and detection means for providing signals relating to the amount and location of any rotational unbalance in the rotating workpiece;

a second operation station fixed to said base member adjacent said first operation station having means for supporting the workpiece and material weight correction means for modifying the weight of the workpiece at a specified location on the workpiece and in an amount calculated in response to signals provided by said detection means;

a transfer module also fixed to said base member for transferring the workpiece between said first station and said second station; and a controller for receiving signals from said detection means and for calculating the amount and location of any weight modification and for providing signals to said first station, second station and transfer module as a result of such calculations;

whereby said first station provides signals related to the original state of unbalance of the workpiece and said transfer module transfers the workpiece to said second station for a weight correction operation in at least two distinct planes after which said transfer module returns the corrected workpiece to said first station for an audit operation to provide signals relating to any remaining unbalance to said controller, wherein said controller compares the unbalance audit data with a pre-established tolerance factor and signals the transfer module to remove the corrected workpiece from said balancing and correction apparatus or return the workpiece to said second station for further weight correction.

3. The apparatus of claim 2, wherein said first station indexes the workpiece to a designated correction position prior to transfer to said second station and the workpiece maintains such designated correction position during its transfer to said second station, such designated correction position being determined by said controller in part from the signals received from said first station.

4. The apparatus of claim 2, wherein said second station indexes the workpiece to a designated correction position as determined by said controller in part from the signals received from said first station.

5. The apparatus of claim 2, wherein said material correction means includes a reversible single spindle mill having at least two sets of cutting heads and a clamp member for engaging the workpiece and holding the workpiece in a designated indexed position with respect to said cutting heads, the indexed position being determined by said controller in part from the signals received from said first station.

6. The apparatus of claim 2, wherein said material correction means includes a clamp member for engaging the workpiece and indexing the workpiece to a designated indexed position and retaining the workpiece in such designated position as determined by said controller in part from the signals received from said first station.

7. The apparatus of claim 2, wherein said controller operates to compare the original measured unbalance with the audited unbalance and adjusts its predesignated correction parameters in accordance with such comparison for future balancing and correction operations on similar workpieces.

8. The apparatus of claim 2, wherein said transfer module includes a slide member extending adjacent said first station, said second station and at least one workpiece transport for carrying workpieces to and from said balancing and correction apparatus, and at least two grip members mounted on a carrier member positioned to move along said slide member between said transport, first station and second station, said grip members being oriented relative to each other such that each of said grid members can engage a workpiece positioned at a common location without any horizontal movement traversing said slide member.

9. The apparatus of claim 8, wherein each of said grip members is oriented on said carrier member and slide member to create a V-like relationship with each other.

10. The apparatus of claim 2, wherein said transfer module includes a slide member extending adjacent said first station, said second station and at least one workpiece transport for carrying workpieces to and from said balancing and correction apparatus, and at least two grip members, each of said grip members being mounted on its own carrier member positioned to independently move on said slide member between said transport, first station and second station, said grip members being oriented relative to each other such that each of said grip members can engage a workpiece positioned at a common location without any horizontal movement traversing said slide member.

11. The apparatus of claim 10, wherein each of said grip members is oriented on its respective carrier member and slide member to create a V-like relationship with each other.

12. The apparatus of claim 2, wherein said transfer module includes two or more slide members extending adjacent said first station, said second station and at least one workpiece transport for carrying workpieces to and from said balancing and correction apparatus, at least two grip members, and at least two carrier members for mounting said grip members, each of said carrier members being positioned on said slide members to move independently on said slide members between said transport, first station and second station, said grip members being oriented relative to each other such that each of said grip members can engage a workpiece positioned at common location without any horizontal movement traversing said side member.

13. The apparatus of claim 12, wherein each of said grip members is oriented on its respective carrier member and slide member to create a V-like relationship with each other.

14. The apparatus of claim 2, wherein said transfer module includes at least one slide member extending adjacent said first station, said second station and at least one workpiece transport for carrying workpieces to and from said balancing and correction apparatus, at least two grip members for carrying the workpiece, and at least one carrier member for mounting two grip members positioned on said slide member to move on said slide member, whereby each grip member can independently retain and carry a workpiece such that each workpiece is simultaneously located over one of said transport, first station, or second station.

15. A three-station balancing and correction apparatus for use in achieving the dynamic balance of a rotating workpiece comprising, in combination:

a unitary base member;

a first operation station positioned on said base member having means for supporting a workpiece, drive means for engaging the workpiece and dynamically rotating the workpiece, and detection means for providing signals relating to the amount and location of any rotational unbalance in the rotating workpiece;

a second operation station positioned on said base member adjacent said first operation station having means for supporting the workpiece, and material weight correction means for modifying the weight of the workpiece at a specified location on the workpiece and in an amount calculated in response to signals provided by said detection means;

a third operation station positioned adjacent said first and second operation stations on said base member having means for supporting a workpiece, drive means for engaging the workpiece and dynamically rotating the workpiece, and audit detection means for providing signals relating to the amount and location of any remaining rotational unbalance in the rotating workpiece;

a transfer module positioned on said base member for transferring the workpiece between said first station, said second station, and said third station; and a controller for receiving signals from said detection means and said audit detection mean and for calculating the amount and location of any weight modification and for providing signals to said first station, second station, third station and transfer module as a result of such calculations;

whereby said first station provides signals related to the original state of unbalance in the workpiece and said transfer module transfers the workpiece to said second station for a weight correction operation in at least two distinct planes after which said transfer module transfers the workpiece to said third station for an audit operation to provide signals relating to any remaining unbalance to said controller, wherein said controller compares the unbalance audit data with a pre-established tolerance factor and signals the transfer module to remove the corrected workpiece from said balancing and correction apparatus or return the workpiece to said second station for further weight correction.

16. The apparatus of claim 15, wherein said first station indexes the workpiece to a designated correction position prior to transfer to said second station and the workpiece maintains such designated correction position during its transfer to said second station, such designated correction position being determined by said controller in part from the signals received from said first station.

17. The apparatus of claim 15, wherein said second station indexes the workpiece to a designated correction position as determined by said controller in part from the signals received from said first station or said third station.

18. The apparatus of claim 15, wherein said material correction means includes a reversible spindle mill having at least two sets of cutting heads and a clamp member for engaging the workpiece and holding the workpiece in a designated index position with respect to said cutting heads, the indexed position being determined by said controller in part from said signals received from said first station or said third station.

19. The apparatus of claim 15, wherein said material correction means includes a clamp member for engaging the workpiece and indexing the workpiece to a designated indexed position and retaining the workpiece in such designated position as determined by said controller in part from signals received from said first station or said third station.

20. The apparatus of claim 15, wherein said controller operates to compare the original measured unbalance with the audited unbalance and adjusts the predesignated correction parameters in accordance with such comparison for future balancing and correction operations on similar workpieces.

21. The apparatus of claim 15, wherein said transfer module includes a slide member extending adjacent said first station, said second station, said third station and at least one workpiece transport for carrying workpieces to and from said balancing and correction apparatus, and at least two grip members mounted on a carrying member positioned to move along said slide member between said transport, first station, second station and third station, said grip member being oriented relative to each other such that each of said grip member can engage a workpiece positioned at a common location without any horizontal movement traversing said slide member.

22. The apparatus of claim 21 wherein each of said grip members is oriented on said carrier member and slide member to create a V-like relationship with each other.

23. The apparatus of claim 15, wherein said transfer module includes a slide member extending adjacent said first station, said second station, said third station and at least one workpiece transport for carrying workpieces to and from said balancing and correction apparatus, and at least two grip members, each of said grip members being mounted on its own carrier member positioned to independently move on said slide member between said transport, first station, second station and third station, slid grid members being mounted relative to each other such that each of said grip members can engage a workpiece positioned at a common location without any horizontal movement traversing said slide member.

24. The apparatus of claim 23, wherein each of said grip members is oriented on its respective carrier member and slide member to create a V-like relationship with each other.

25. The apparatus of claim 15, wherein said transfer module includes two or more slide members extending adjacent said first station, said second station, said third station and at least one workpiece transport for carrying workpieces to and from said balancing and correction apparatus, at least two grip members, and at least two carrier members for mounting said grip members, each of said carrier members being positioned on said slide members to independently move on said slide members between said transport, first station, second station and third station, said grid members being oriented relative to each other such that each of said grid members can engage a workpiece positioned at a common location without any horizontal movement traversing said slide member.

26. The apparatus of claim 25, wherein each of said grip members in oriented on its respective carrier member and slide member to create a V-like relationship with each other.

27. The apparatus of claim 15, wherein said transfer module includes at least one slide member extending adjacent said first station, said second station, said third station and at least one workpiece transport for carrying workpieces to and from said balancing and correction apparatus, at least two grip members for carrying the workpiece, and at least one carrier member for mounting two grip members positioned on said slide member to move on said slide member, whereby each grip member can independently retain and carry a workpiece such that each workpiece is simultaneously located over one of said transport, first station, second station or third station.

* * * * *